UNITED STATES PATENT OFFICE.

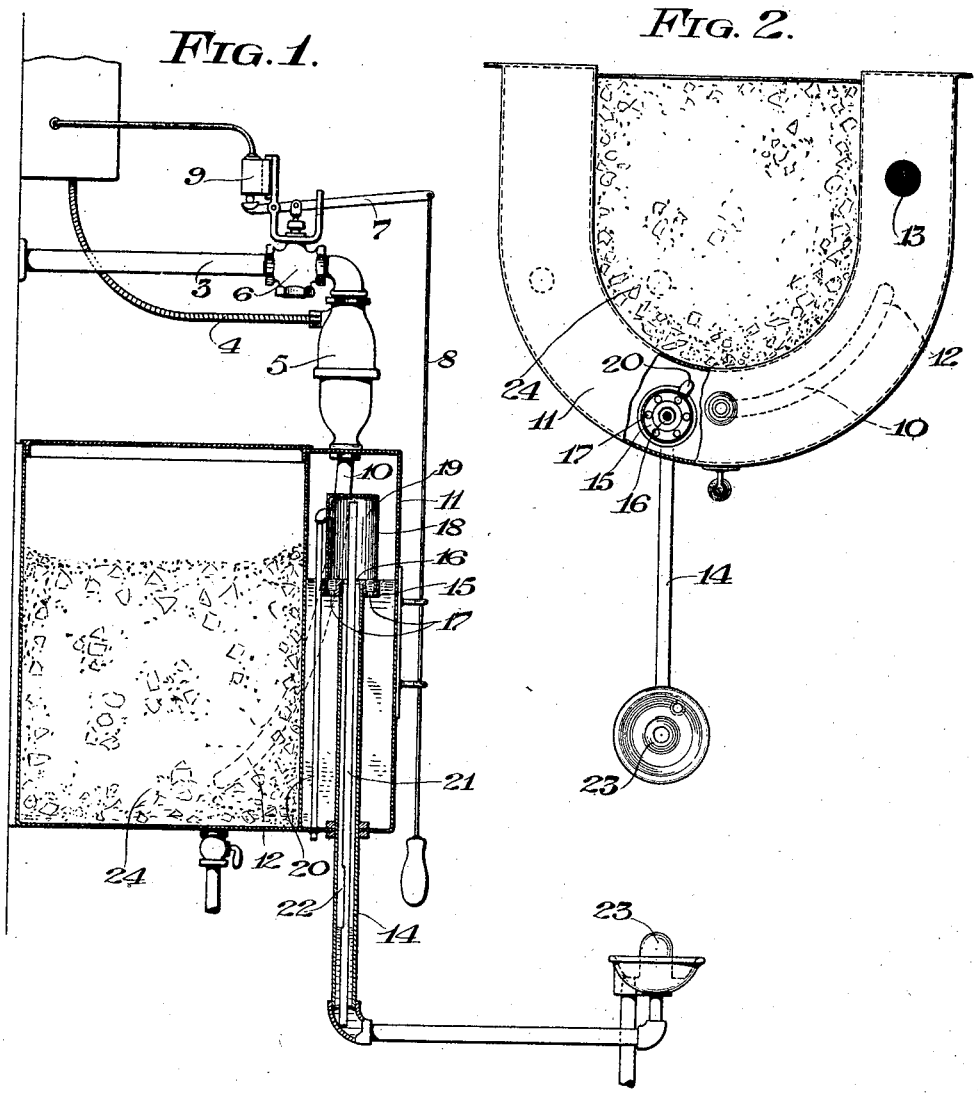
W. E. GEST.
OZONE FUME REMOVING APPARATUS.
APPLICATION FILED APR. 28, 1920.
1,378,104. Patented May 17, 1921.

WILLIAM E. GEST, OF MILWAUKEE, WISCONSIN, ASSIGNOR TO OZONE COMPANY OF AMERICA, OF MILWAUKEE, WISCONSIN, A CORPORATION OF DELAWARE.

OZONE-FUME-REMOVING APPARATUS.

1,378,104.  Specification of Letters Patent.  Patented May 17, 1921.

Application filed April 28, 1920. Serial No. 377,295.

*To all whom it may concern:*

Be it known that I, WILLIAM E. GEST, a citizen of the United States, and resident of Milwaukee, county of Milwaukee, and State of Wisconsin, have invented new and useful Improvements in Ozone-Fume-Removing Apparatus, of which the following is a description, reference being had to the accompanying drawings, which are a part of this specification.

The invention relates to ozonizing apparatus.

To many people the odor of fumes produced upon the generation of ozone are objectionable and yet they desire to secure the beneficial effects of drinking water purified with ozone. It is therefore the object of this invention to provide an apparatus by which the free fumes produced upon the generation of ozone are separated from the ozonized water prior to its use.

The invention further consists in the several features hereinafter set forth and more particularly defined by claims at the conclusion hereof.

In the drawings: Figure 1 is a view of an apparatus embodying the invention, parts being shown in section; Fig. 2 is a top view of the tank, parts being broken away.

The numeral 3 designates a water supply pipe, 4 an ozonized air supply pipe, 5 an ozone mixing nozzle in communication with pipes 4 and 5. The supply of water is controlled by a valve in the fitting 6 operated by a lever 7 and pull rod 8, said lever also actuating a switch 9 to close the circuit through the ozonizing apparatus. All this is of known construction and functions to introduce ozonized water into a pipe 10.

If the ozonized water is used direct from pipe 10 it will be found to contain fumes produced upon the generation of the ozone which are sometimes objectionable. To relieve the water of these fumes it is passed through the pipe 10 into a tank 11, the end 12 of the pipe being curved to one side so as to dispose its delivery point at a distance from where the water is withdrawn from the tank, and the fumes liberated in the tank pass off through an opening 13 and are prevented from passing to the delivery pipe 14 by means hereinafter described.

The delivery pipe 14 passes up through the bottom of the tank and carries a cup 15. This cup has a central opening 16 communicating with the upper end of the pipe 14 and a plurality of openings 17 in its bottom disposed below the level of the ozonized water in the tank. A cover 18 is secured to the bottom of the cup and with it forms a closed chamber 19 having its inlets 17 sealed by the water in the tank. To prevent any syphoning effect of the water a pipe 20 leads from the chamber 19 to a position without the tank. The water flowing through the bottom of the cup discharges into the pipe 14 and naturally carries air down with it and to relieve any pressure of air carried down by the water a pipe 21 is disposed in the pipe 14 with its upper end communicating with the air in the chamber 19 and with an opening 22 near its lower end through which the air may pass. In this way the air in pipe 14 passes up through the pipe 21 through chamber 19 and thence is discharged to the outer air through the pipe 20. The lower end of the opening 22 is about on the level with the discharge orifice of the bubbler 23 so as to provide a quick stoppage of the flow of water to the bubbler when the supply of water to the tank is shut off.

The tank 11 is here shown of crescent shaped formation to provide a separate cooling chamber 24 adapted to contain ice for cooling the ozonized water, the tank 11 and chamber 24 being provided with suitable drainage openings shown in dotted lines in Fig. 2.

With the above construction any free odorous gases or fumes which pass into the tank through the pipe 10 escape from the top of the tank and are prevented from passing through the pipe 14.

I desire it to be understood that this invention is not limited to any specific form or arrangement of parts except in so far as such limitations are specified in the claims.

What I claim as new and desire to secure by Letters Patent is:

1. In a device of the character described, an outlet structure for an ozonized water tank comprising a delivery pipe communicating with the tank, an inclosure forming an air chamber at the upper end of said pipe and provided with water sealed inlets to prevent the passage of free fumes from the tank to the delivery pipe, and means for equalizing the pressure in the air chamber.

2. In a device of the character described, an outlet structure for a tank containing ozonized water comprising a delivery pipe communicating with the tank, an inclosure forming an air chamber at the upper end of said pipe and provided with water sealed inlets to prevent the passage of free fumes from the tank to the delivery pipe, a pipe connecting said chamber with the atmosphere and a pipe in said delivery pipe communicating with said air chamber and with said delivery pipe to relieve air pressure in said delivery pipe.

3. In a device of the character described, an outlet structure for a tank containing ozonized water comprising a delivery pipe, an inclosure forming an air chamber at the upper end of said pipe and provided with water sealed inlets to prevent the passage of free fumes from the tank to the delivery pipe, and means for equalizing the pressure in said chamber and delivery pipe.

4. In a device of the character described, an outlet structure for the ozonized water tank comprising a delivery pipe communicating with the tank, an inclosure forming an air chamber at the upper end of said pipe and provided with water-sealed inlets to prevent passage of free fumes from the tank to the delivery pipe, a pipe connecting said chamber with the atmosphere, and a pipe in said delivery pipe communicating with the air chamber and having an opening near its lower end to relieve air pressure in said delivery pipe and quickly stop the flow therethrough.

In testimony whereof, I affix my signature, in presence of two witnesses.

WILLIAM E. GEST.

Witnesses:
WILLIAM G. LINDEMAND,
JULIUS E. KIEFER.